(No Model.) 2 Sheets—Sheet 1.
J. A. KENNEDY-McGREGOR.
CASTER.
No. 606,462. Patented June 28, 1898.
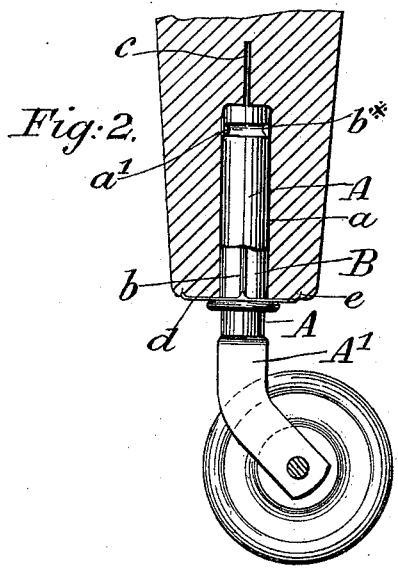
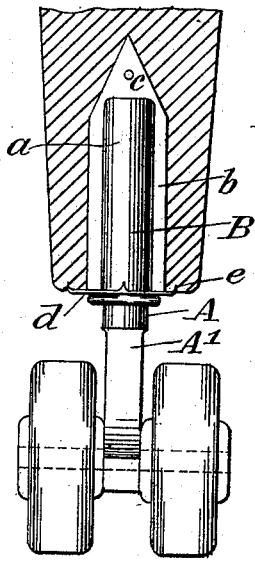
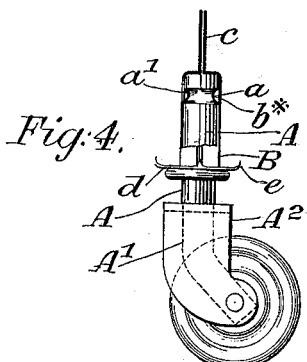
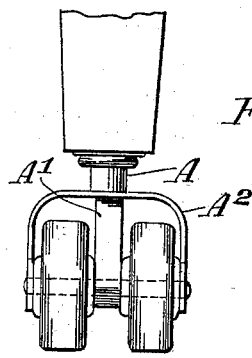
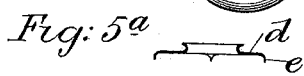
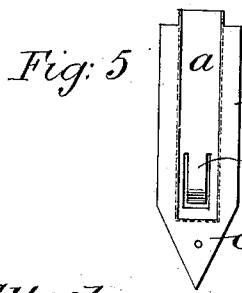
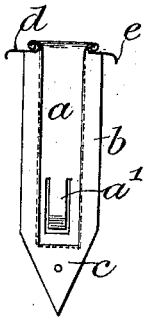
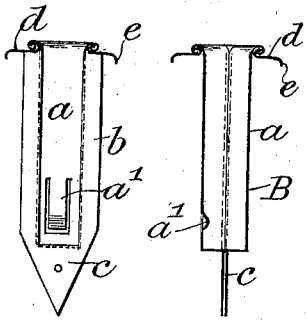
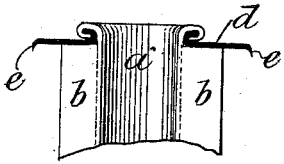
Attest:
Nellie Maguire
A. V. Bourke
Inventor
John A Kennedy McGregor
by Phillipp, Munson & Phelps
Attys
THE NORRIS PETERS CO., PHOTO-LITHO., WASHINGTON, D. C.

(No Model.) 2 Sheets—Sheet 2.
J. A. KENNEDY-McGREGOR.
CASTER.
No. 606,462. Patented June 28, 1898.
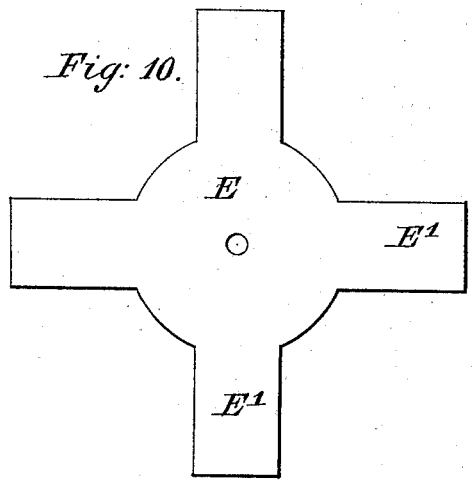
Fig: 10.
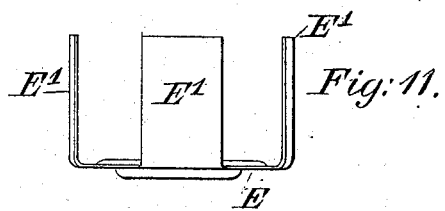
Fig: 11.
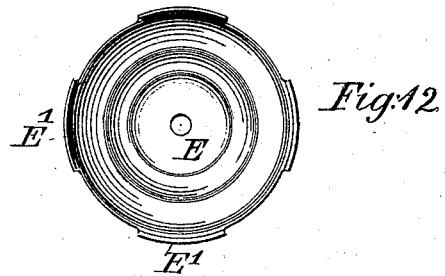
Fig: 12.
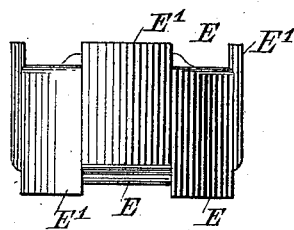
Fig: 13.
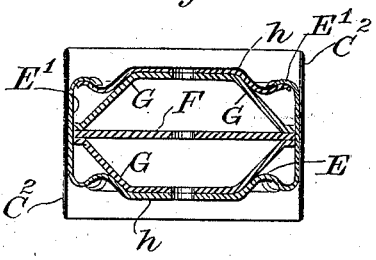
Fig: 15.
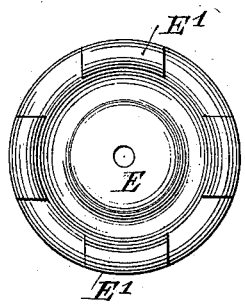
Fig: 14.
Fig: 16
Attest:
Nellie Maguire
A. W. Bourk
Inventor:
John A. Kennedy McGregor
by Philipp, Munson & Phelps
Attys
THE NORRIS PETERS CO., PHOTO-LITHO., WASHINGTON, D. C.

UNITED STATES PATENT OFFICE.

JOHN A. KENNEDY-McGREGOR, OF CHICAGO, ILLINOIS.

CASTER.

SPECIFICATION forming part of Letters Patent No. 606,462, dated June 28, 1898.

Application filed April 4, 1896. Serial No. 586,155. (No model.)

*To all whom it may concern:*

Be it known that I, JOHN ALEXANDER KENNEDY-MCGREGOR, of Chicago, Illinois, have invented certain new and useful Improvements Relating to Furniture-Casters, of which the following is a specification.

This invention relates to furniture-casters of various kinds; and it consists in the manner of constructing the various parts, whereby simplicity, economy, and efficiency are obtained.

In the accompanying drawings, Figure 1, Sheet I, is a front view of one form of caster with certain of my improvements adapted thereto, Fig. 2 being a side view with one wheel or roller of a pair removed. Figs. 3 and 4 are similar views of a slight modification, showing the addition of a horn. Figs. 5 and 5ª represent the two parts of a socket for the pivot-pin in juxtaposition. Fig. 6 shows the parts brought together. Fig. 7 is a section taken at right angles to Fig. 6, and Fig. 8 is a cross-section of the same figure. Fig. 9 is a sectional view, on an enlarged scale, showing how the two parts are secured together. Figs. 10 to 16, Sheet II, show the various operations in the construction of wheels for casters according to my invention.

Referring now to Figs. 1 to 4, which relate to what are known as "pin-casters," A is a cylindrical pin, and B the pin-socket, which is let into the piece of furniture—say the leg of a table. The pin A rotates in the socket B and is held therein by a spring-piece $a'$, stamped out of the socket, which enters a groove $b^*$ near the end of the pin. This form of pin and socket is now well known. I prefer to form the upper part A of the pin round; but the lower part A' is flattened by being struck between dies. The pin is also at this part bent at an angle, as seen in Fig. 2, in order that the axle of the caster-wheels may be supported in position to cause the swiveling of the pin. The flattening of this pin gives great strength at the bend and also provides space for a hole to receive the axle of a pair of wheels or rollers. In Figs. 3 and 4 the same form of caster is shown, but the pin is combined with a stamped bridge or horn $A^2$, which serves to support the outer ends of the wheel-axle, the flattening of the pin forming a shoulder at the junction between the flattened and round portions of the pin against which the horn rests.

The end of the pin A bears against and turns on the end of the socket B, which is thus liable to wear away, and I therefore propose to strengthen the end of the socket, as hereinafter described. The socket B is also liable to work loose in the leg of the table and to fall out, and part of my invention is designed to prevent this. Further, I secure the mouth of the socket in such a manner that by no possible chance can the mouth spread and break away the wood of the leg of the piece of furniture under the strain of the working.

To carry out my invention so far as above indicated, I stamp out the socket B in two parts from sheet metal, each part consisting of a semitubular portion $a$, with a flange $b$ at each side and a triangular extension $c$ of each flange at the end. The parts $a$ are slightly longer than the parts $b$, as seen in Fig. 5, and in one of the parts $a$ the retaining-spring $a'$ is formed. When the two portions $a\ b\ c$ are put together to form the socket B, the parts $c$ are first firmly secured together by a rivet or in any other convenient manner. The plate or collar $d$ (of the form shown in Fig. 5ª) is next placed upon the extending portion of $a$, and then by the blow of a suitably-formed punch the part $a$ is caused to curl round and take under or interlock with the curled-over part of the plate $d$, as will be clearly seen in the enlarged view, Fig. 9.

In adapting the socket to the article of furniture a hole is first bored in the article the size and length of the tubular portion $a$ of the socket, and the socket is then driven in.

The triangular extension $c$ cuts its way in the wood and forms the paths for the flanges $b$, which become firmly fixed in the grooves thus formed, so that the socket B cannot turn round in the hole nor move in any direction. The triangular end $c$ also forces its way into the solid wood at the end of the hole, and should the end of the tube become worn away will always present a metal bearing-surface to the end of the pin.

The plate or collar $d$ may be formed with points $e$ (see Fig. 9) to enter the end of the leg or the wood of the article of furniture, and, if necessary, the plate $d$ may be secured by two or more screws to the furniture.

In producing wheels for casters according to this invention I proceed in the following manner, reference being had to Sheet II of the drawings: I take a sheet of metal and stamp out blanks of the form shown at Fig. 10—that is to say, a central disk portion E, with radial arms E'. I then subject these blanks to treatment in a die, by which the radial arms E' are turned up and the central boss or bulge in the disk portion E is formed, as shown at Figs. 11 and 12. I next take saucer-shaped and flat disks, as shown at F and G, Figs. 15 and 16, and place them inside one of the formed parts, and I place another formed part over them, so that the arms E' of one part will interlock with the arms E' of the other and extend beyond the respective bulged portions, as shown in Fig. 13. I then subject the parts thus assembled to pressure in suitable dies, whereby the extending portion of each arm is curled over and caused to grip against the bottom of the opposite part, as shown in Fig. 14. I then take the wheel thus formed and place it inside a piece of brass tube $C^2$ with thin brass disks $h$ on each face, (see Fig. 15,) and by suitable dies I cause the ends of the brass tube $C^2$ to curl inward, as described in the specification of my Patent No. 557,597, dated April 7, 1896, so as to grip the brass disks against the steel lining and produce what to all appearance is a brass wheel, but which will have enormous strength by reason of the interlocking steel lining, as shown in Fig. 16.

It will be obvious that a strong wheel would also be made if the material employed were all brass.

What I claim is—

1. A socket for a pin-caster, as herein shown and described, consisting of two parts, each having a semitubular portion, an external flange on either side, and a triangular-shaped prolongation, the two parts being riveted or otherwise secured together at the end, the mouth of the tubular portion being secured by an overhanging flanged annular plate, with which the tubular portion is caused to interlock, as shown and described.

2. A wheel for casters consisting of a flat disk, two saucer-shaped spacing-disks placed on opposite sides of the flat disk with their edges inward, two shaped disks having equidistant lugs or arms turned up at right angles to the disk portions and which are placed outside the other disks and are so arranged that the arms of one shaped disk will interlock with the arms of the other shaped disk, the arms of each disk extending beyond the other disk so that by pressure in a die the extending portions may be caused to curl round and grip onto the outside of the opposite disk portion, facing pieces or disks placed outside the lining formed as above, and a length of tube, the ends of which by pressure in a die are caused to curl round inward to press the facing pieces against the lining and secure all the parts firmly, as set forth.

3. A wheel for casters consisting of spacing-pieces, two shaped disks formed with equidistant lugs or arms, the arms of one disk adapted to interlock with the arms of the other disk and to overlap, the overlapping portions being curled round by pressure in a die to grip onto the outer face of the opposite disk, as set forth.

JOHN A. KENNEDY-McGREGOR.

Witnesses:
H. K. WHITE,
A. W. SPACKMAN.